United States Patent [19]

Brown

[11] Patent Number: 5,739,663
[45] Date of Patent: Apr. 14, 1998

[54] PHASE ENERGIZATION CONTROLLER AND METHOD FOR CONTROLLING SWITCHED RELUCTANCE MACHINES USING SIMPLE ANGULAR POSITION SENSORS WITH IMPROVED ANGLE INTERPOLATION

[75] Inventor: Geoffrey T. Brown, Harrogate, England

[73] Assignee: Switched Reluctance Drives Limited, Harrogate, United Kingdom

[21] Appl. No.: 744,614

[22] Filed: Nov. 6, 1996

[30] Foreign Application Priority Data

Nov. 14, 1995 [GB] United Kingdom ............... 9523256

[51] Int. Cl.⁶ .................. H02P 7/00; H02P 9/00
[52] U.S. Cl. ............. 318/701; 318/603; 318/254
[58] Field of Search ............. 318/430–439, 318/701–732, 560–696; 360/70–76; 341/9, 1, 2, 3, 11, 6; 369/44, 28, 25, 32; 242/186, 75.51

[56] References Cited

U.S. PATENT DOCUMENTS

| | | | |
|---|---|---|---|
| 4,870,559 | 9/1989 | Hyatt | 364/130 |
| 4,980,839 | 12/1990 | Souji et al. | 364/513 |
| 5,013,988 | 5/1991 | Sakano | 318/602 |
| 5,196,775 | 3/1993 | Harris et al. | 318/638 |
| 5,202,614 | 4/1993 | Peters et al. | 318/254 |
| 5,202,616 | 4/1993 | Peters et al. | 318/254 |
| 5,216,651 | 6/1993 | Hwang | 369/44.28 |
| 5,382,889 | 1/1995 | Peters et al. | 318/254 |
| 5,457,371 | 10/1995 | Gordon | 364/513 |
| 5,469,039 | 11/1995 | Stephenson et al. | 318/701 |
| 5,491,391 | 2/1996 | Bahr et al. | 364/130 |
| 5,545,964 | 8/1996 | Stephenson et al. | 318/701 |
| 5,563,488 | 10/1996 | Stephenson et al. | 318/701 |
| 5,602,544 | 2/1997 | Takahashi et al. | 318/652 |
| 5,621,288 | 4/1997 | Seki et al. | 318/431 |
| 5,650,779 | 7/1997 | Sugden | 341/9 |
| 5,652,494 | 7/1997 | Sugden | 318/701 |
| 5,654,836 | 8/1997 | Oh | 318/437 |

FOREIGN PATENT DOCUMENTS 0 534 761  3/1993  European Pat. Off. .......... H02P 7/00

OTHER PUBLICATIONS

Stephenson and Blake, "The Characteristics, Design and Applications of Switched Reluctance Motors and drives," PCIM Conference & Exhibition, Jun. 21–24, 1993, Nuremberg, Germany.

Chappell et al., "Microprocessor Control of a Variable Reluctance Motor," IEE Proceedings, vol. 131, No. 2, pp. 51–60, Mar. 1984.

*Primary Examiner*—Paul Ip
*Attorney, Agent, or Firm*—Arnold, White & Durkee

[57] ABSTRACT

An angle interpolation circuit for a phase energisation controller receives absolute positions from sensors and interpolates conduction angles for each phase in a switched reluctance machine having one or more phases. It uses a frequency multiplier to generate an integer number of pulses between the edges of the sensor signal for clocking a corresponding counter for each machine phase. The circuit adjusts for variations in the mark/space ratio of sensor inputs by setting the counters' expected values at each sensor edge.

32 Claims, 12 Drawing Sheets

PROPOSED SYSTEM (4 PHASE)

PHASE ENERGIZATION CONTROLLER AND METHOD FOR CONTROLLING SWITCHED RELUCTANCE MACHINES USING SIMPLE ANGULAR POSITION SENSORS WITH IMPROVED ANGLE INTERPOLATION

FIELD OF THE INVENTION

The present invention generally relates to a phase energisation controller and method for controlling a switched reluctance motor. More particularly, the present invention relates to a method and apparatus for controlling the supply of voltage pulses to the windings of a switched reluctance motor using simple angular position sensors to provide information for the interpolation of conduction angles.

BACKGROUND OF THE INVENTION

Electric motors turn electrical energy into mechanical energy to produce work. Electric motors work by applying a voltage across one or more windings, thereby energising the winding(s) to produce a resultant magnetic field. Mechanical forces of attraction or repulsion caused by the magnetic field cause a rotor in an electric motor to move. The efficiency of the electric motor depends in part on the timing and magnitude of each application of voltage to the motor. Timing of the voltage being applied is particularly important in the case of switched reluctance motors.

Historically, the switched reluctance motor was thought to be incapable of competing effectively with other types of motors. More recently however, a better understanding of motor design and the application of electronically controlled switching has resulted in a robust switched reluctance drive capable of high levels of performance over a wide range of sizes, powers and speeds. Note that the term "motor" is used here, but it will be appreciated by those skilled in the art that the term covers the same machine in a generating mode unless a particular distinction is made.

The switched reluctance motor is generally constructed without windings or permanent magnets on the rotating part (the rotor) and generally includes electronically-switched windings carrying unidirectional currents on the stationary part (the stator). Commonly, pairs of diametrically opposed stator poles may be connected in series or parallel to form one phase of a potentially multi-phase switched reluctance motor. Motoring torque is produced by applying voltage across each of the phase windings in a predetermined sequence that is synchronized with the angular position of the rotor so that a magnetic force of attraction results between poles of the rotor and stator as they approach each other. Similarly, generating torque is produced by positioning the voltage pulse in the part of the cycle where the poles are moving away from each other. The general theory of design and operation of switched reluctance machines is well known and discussed, for example, in *The Characteristics, Design and Applications of Switched Reluctance Motors and Drives*, by Stephenson and Blake and presented at the PCIM '93 Conference and Exhibition at Nürnberg, Germany, Jun. 21–24, 1993.

There have been various strategies proposed in the past for controlling switched reluctance motors as part of an overall variable speed drive system. In general, these strategies may be divided into two broad groups: systems that employ current magnitude control over a fixed angle of rotor rotation, and systems that employ voltage control where the angular position at which the applied voltage is controlled. Often, these strategies are combined with each being used during particular periods of the motor's operation. The present invention is directed to angular position voltage control systems.

At high speeds, the torque of the motor is commonly controlled by controlling the position and duration of the voltage pulse applied to the winding during the phase period. Because a single pulse of voltage is typically applied during each phase period, this form of control is often referred to as "single-pulse control." In single-pulse control, the torque level is defined by the magnitude and shape of the voltage pulse which, in turn, is generally determined by: the angular speed of the rotor; the point during the rotor's rotation when voltage is applied to the phase winding by closing one or more switches (referred to as the "TURN-ON angle"); the point during the rotor's rotation when the application of voltage to the winding is reversed by opening one or more switches (referred to as the "TURN-OFF angle"); and, the magnitude of the voltage applied to the phase winding. The TURN-ON and TURN-OFF angles define a "conduction angle." The conduction angle is the angular distance between the TURN-ON and the TURN-OFF angles.

Some previous switched reluctance motors have used simple angular position sensors to provide the rotor position information necessary to energize the phase windings during their respective conduction angles. Normal practice is to use a two-sensor arrangement for four-phase machines, and a three-sensor arrangement for three-phase machines. One of the advantages to using this type of system is the low sensor cost.

FIG. 1 shows the principal components of a switched reluctance drive system 10 for a switched reluctance machine. The input DC power supply 11 can be either a battery or rectified and filtered AC mains. The DC voltage provided by the power supply 11 is switched across the phase windings of the machine 13 by a power converter 12 under control of the electronic control unit 16. The switching must be correctly synchronized to the angle of rotation of the rotor for proper operation of the drive 10. As such, a rotor position detector 15 is typically employed to supply signals corresponding to the angular position of the rotor. The output of the rotor position detector 15 may also be used to generate a speed feedback signal.

The rotor position detector 15 may take many forms. In some systems, the rotor position detector 15 can comprise a rotor position transducer that provides output signals that change state each time the rotor rotates to a position where a different switching arrangement of the devices in the power converter 12 is required, or when the rotor rotates to a particular position where the rotor and stator poles are aligned with each other.

FIG. 2 shows the elements of a typical four-phase switched reluctance machine 13. The machine 13 has eight salient poles 26a–h on the stator 28 and six poles 20a–f on the rotor 22. Each stator pole 26a–h carries a simple exciting coil 24a–h. Opposite coils 24a and 24e, 24b and 24f, 24c and 24g, 24d and 24h are connected to form north/south pole pairs for the four phase windings. Only one phase circuit 26 is shown for the opposite coils 24a and 24e. The opposite coils 24a and 24e are excited from a DC supply 29 through two switches or transistors (S1 and S2), and two diodes (D1 and D2) allow energy to return to the supply 29. Other switching circuits are well known in the art.

If it is desired to operate the machine 13 as a motor, torque is developed in the machine 13 by the tendency for the magnetic circuit to adopt a configuration of minimum reluctance, i.e., for an opposing pair of rotor poles 20a and 20d, 20b and 20e, and 20c and 20f to be pulled into alignment with an excited pair of stator poles 26a–h, maximizing the inductance of the exciting coils 24a–h. By switching the phases in the appropriate sequence, the rotor 22 will continuously rotate in the chosen direction so that torque is developed continuously in the appropriate direction. Moreover, the larger the current supplied to the coils 24a–h, the greater the torque. Conversely, if it is desired to operate the machine as a generator, the coils are excited as the rotor poles move away from the stator poles: power is then transferred from the shaft of the machine to the electrical supply.

The positional information provided by a typical rotor position transducer (RPT) is normally of the form shown in FIG. 3, which shows the outputs of the three-sensor RPT typically used for a three-phase switched reluctance drive. RPT A is the signal used to drive phase A of the machine. The signals are cyclic over one inductance cycle, i.e., the angular period defined as the angular movement of the rotor between one pair of stator poles having one pair of rotor poles aligned with them and having an adjacent pair of rotor poles aligned with them. The three signals are displaced from each other by one third of a cycle. The RPT is usually arranged relative to the rotor shaft so that the edges of the RPT signals correspond to a particular part of the inductance cycle. e.g., $\theta_1$, on RPT A would normally correspond to the minimum inductance point on the inductance cycle and $\theta_2$ would then correspond to the maximum inductance position. Because of the mechanical symmetry of the geometry of the machine, the signals RPT B and RPT C correspond to similar points on the inductance cycle of phases B and C respectively.

All this is well-known in the art, as is the adjustment of the mechanical parts of the RPT assembly to ensure that the RPT signals have an equal mark: space ratio.

In one of the simplest methods of control of a switched reluctance rotor, the phase excitation can be linked directly to the appropriate RPT signal, i.e., when the sensor signal RPT A rises to logic $\theta 1$ ($\theta_1$ in FIG. 3), the phase is energised by closing switches S1 and S2 in FIG. 2. When the rotor moves to $\theta_2$, the phase is de-energised by opening the switches S1 and S2, allowing the flux associated with phase A and the current in the winding to decay to zero by virtue of the current flowing through the diodes and back to the supply.

Although at low machine speeds the sensor edge will typically correspond to the TURN-ON angle, high machine speeds require that the TURN-ON angle be advanced by some varying amount. Since the sensors of FIG. 3 only provide a sensor edge twice in each inductance cycle, they do not provide sufficient resolution of the rotor position necessary to energize the phase windings during their respective conduction angles. Consequently, such switched reluctance drive systems ordinarily interpolate angles between sensor edges to provide sufficient resolution of the rotor position.

As seen in FIG. 4, one prior art method of interpolation uses a frequency multiplier 31 for each motor phase to generate an integer multiple of pulses between the sensor signal for clocking a corresponding counter 32 for each machine phase. This generates counter values which increase at a rate proportional to the speed of rotation of the rotor. CE is the clock enable input on the counter 32 and prevents the clock changing the counter state when low. TC is the terminal count output of the counter 32 and is high when the counter is at its maximum value. Both the counter 32 and the frequency multiplier 31 for each machine phase are reset at the occurrence of their respective timing sensor edge corresponding to that phase. The outputs of each of these counters 32 are provided to two digital comparators 33 and 36 per machine phase which are used to provide the firing signals needed for energising the phase windings at their respective TURN-ON and TURN-OFF angles. A third digital comparator for providing a signal at the free-wheel angle may also be used as is known by those skilled in the art. The other input to each of these comparators 33 and 36 is typically provided by a pre-interpolated control map in a memory device such as an EPROM.

Since each of the frequency multipliers for each phase are corrected for the current motor speed at their respective sensor edge, the interpolated angles are always being extrapolated from the prior measurement of the period between these edges. The output of the frequency multiplier is only updated once per cycle, allowing relatively large errors to accumulate during rapid acceleration or deceleration. Furthermore, this arrangement requires one frequency multiplier for each phase of the machine.

As seen in FIG. 5, one prior art method used to improve these prediction problems in multi-phase systems having more than one position sensor (e.g., a four-phase machine with two position sensors or a three-phase machine with three position sensors) uses a frequency multiplier 42 for all machine phases and updates that frequency multiplier 42 at each of the sensor edges. Here, instead of interpolating based on the entire prior machine phase cycle, the interpolation is based on portions of different phases. Thus, the frequency multiplier 42 will be updated responsive to machine acceleration and deceleration more often.

When visualizing the arrangement of FIG. 5, it is helpful to consider the angles as digital "ramps" with the rising "ramp" representing the rising count. If a four-phase machine with two sensors is taken as an example, then the RPT signals RPT A and RPT B shown in FIG. 6a will be available. If each of these has a 50% mark:space ratio, they may be X-ORed as shown in FIG. 5 to give the combined signal SENSOR PULSE shown in FIG. 6a. This gives four pulse edges per inductance cycle. The frequency multiplier 42 then only needs to multiply by 64 to produce 256 pulses per phase cycle. As shown in FIG. 6a, each of the four digital ramps A,B,C, and D represent the count for each respective phase. Also shown in this timing diagram are the sensor inputs, RPT A and RPT B, as well as the output of exclusive-or gate 41. Each ramp A, B, C, and D is reset by one of the sensor edges; it is common to set the sensor edges to coincide with the aligned position of each of the phases. While this system provides some improvement for acceleration or deceleration errors, it requires precise sensor positioning which may not be practical to implement, given practical manufacturing tolerances, especially tolerances associated with low cost machines. Moreover, it can be shown mathematically that any variation in the mark:space ratio will produce faster ramps for all phases. These variations cannot be designed out, since they vary with each particular machine. Thus, sub-optimal performance will manifest itself in the form of lower torques and reduced machine efficiency.

Only the frequency multiplier 42 of FIG. 5 and the 8-Bit latches can be used for all the phases. The remaining circuitry is specific to each phase.

It will be realized from a consideration of FIG. 6B that the prior art corrected for variations once per phase inductance cycle. In other words, the counter would be reset at zero, and then count up to maximum count only once during the phase inductance cycle. These prior art systems did not have the capability of correcting on the edge of each RPT signal.

Thus, a need exists for a method and circuitry for interpolating conduction angles with reduced error particularly in a system which adjusts for variations in the mark:space ratio of sensor inputs on each RPT edge. While the prior art will correct the frequency multiplier rate once during the phase inductance cycle, this invention extends the idea of this correction by setting the "ramps" to the expected value at each of the sensor edges, thus preventing the ramps from drifting for more than one sensor period between adjacent sensor edges. In the case of a three-phase machine with three sensors, this is a factor of six improvement over prior art systems.

SUMMARY OF THE INVENTION

The invention provides a method and apparatus of interpolating conduction angle including counting between features, such as one edge of a digital pulse, to provide data from which position information is derivable. The tendency of the count to drift in a phase inductance cycle is limited to the period between features. At each feature detection there is an effective correction of the count.

In one form, the present invention is used in controlling the energisation of the windings in a switched reluctance machine having more than one phase winding using readings from angular position sensors and interpolating these sensor values electronically to obtain adequate resolution on each sensor edge.

One aspect of the present invention for controlling the energisation of a phase winding involves generating normalized TURN-ON and TURN-OFF signals using a normalized rotor position count, and then generating a voltage control pulse defined by the normalized TURN-ON and TURN-OFF signals for energising the appropriate phase winding.

In accordance with another aspect of the present invention a TURN-ON/TURN-OFF circuit generates a normalized TURN-ON signal and a normalized TURN-OFF signal when the normalized rotor position count reaches a predetermined TURN-ON count and a predetermined TURN-OFF count. Then, a phase pulse circuit generates a voltage control pulse defined by the normalized TURN-ON and TURN-OFF signals for energising the appropriate phase.

BRIEF DESCRIPTION OF THE DRAWINGS

These and other aspects and advantages of the present invention will become apparent upon reading the following detailed description of embodiments of the invention which are given by way of example and upon reference to the drawings in which.

DETAILED DESCRIPTION OF THE DRAWINGS

Illustrative embodiments of the invention are described below as they might be implemented using the improved angle interpolation circuitry and methods to create a simpler, more efficient, and more accurate, conduction angle controller for the phases of a switched reluctance machine. In the interest of clarity, not all features of an actual implementation are described in this specification. It will of course be appreciated that the development of any such actual implementation would be a routine undertaking for those of ordinary skill having the benefit of this disclosure.

Figure 7:
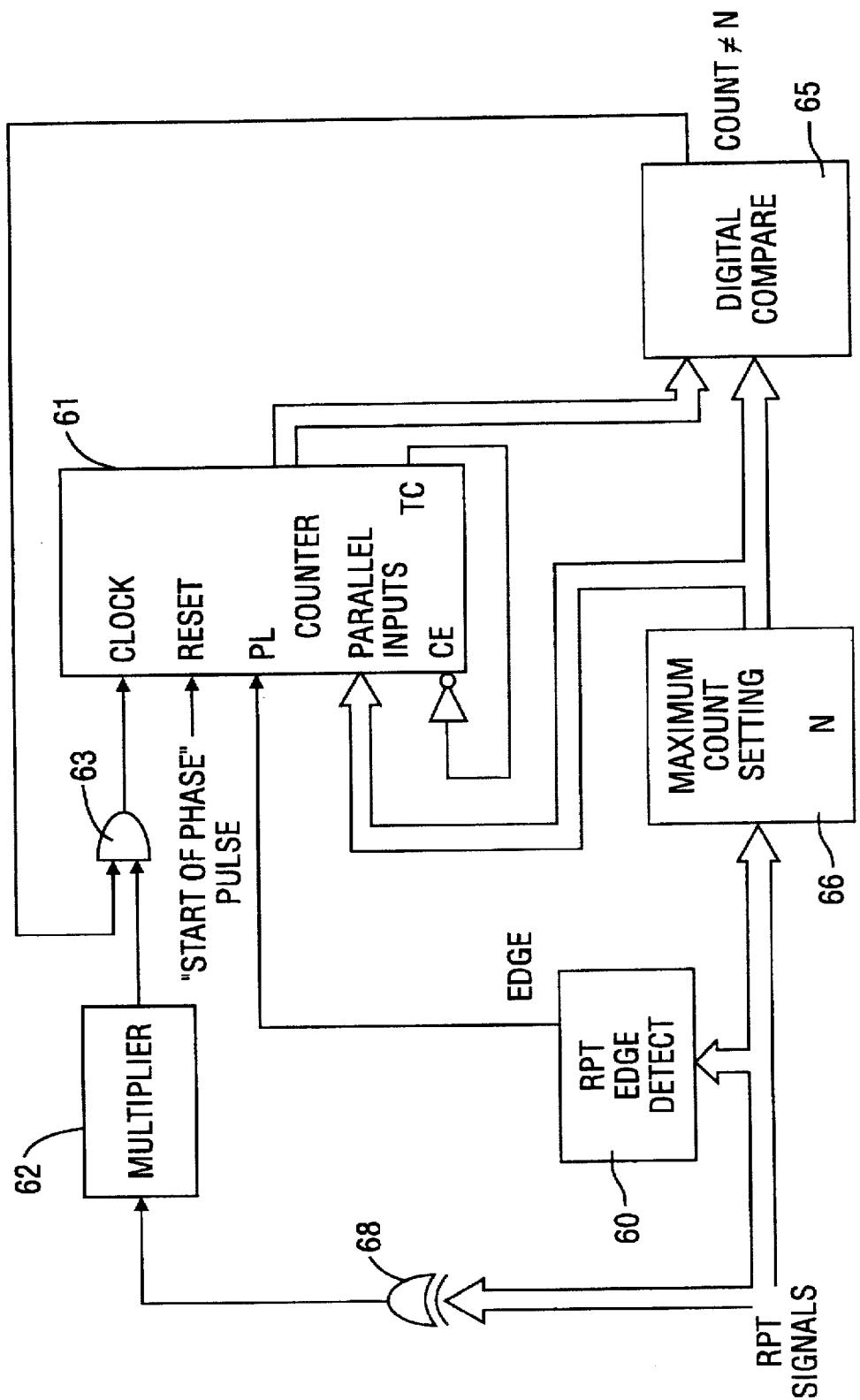
FIG. 7 is a block diagram of one embodiment of the present invention.

Conceptually, a simple embodiment of the invention is shown in FIG. 7. The output RPT signal pulses from a conventional RPT sensor are supplied to an RPT edge detector 60 which produces edge pulses coincident with the rising and falling edges of the RPT signal pulses. The RPT signal pulses are also passed through an exclusive OR arrangement 68 and to a frequency multiplier (62), which has a multiplying factor of n (64 in this embodiment). The multiplied signal from the multiplier 62 is the clock signal to a counter 61. The multiplied signal is actually submitted to one input of a two-input AND gate 63 which is also supplied with the output of a digital comparator 65 so that the multiplied signal from the multiplier is only admitted to the clock input of the counter according to the state of the digital comparator 65. This is described below.

The edge signal directly from the edge detector 60 is applied to the parallel load input PL of the counter 61. This PL input to the counter presets the counter at each edge signal.

The RPT signals are also applied to the input of a maximum count setting device 66 which produces an output (N) which is the maximum count permitted for the current RPT state. The output of the device 66 is supplied to parallel inputs of the counter 61 and provides the other input to the digital comparator 65.

The counter 61 is enabled between adjacent sensor edges only until a maximum count for that angular region is reached; the counter 61 is stopped by preventing further clock pulses. If the frequency multiplier 62 is running too fast, the counter 61 will be stopped when the maximum count N is reached; if it is running too slow, the maximum count N will not be reached before the next sensor edge output from the edge detector. When the next sensor edge is detected, the counter 61 will be loaded with the correct count corresponding to that particular sensor edge, "PL" being the parallel load command, and the counter 61 will then be enabled thereafter. The reset input to the counter 61 is needed to start the whole phase cycle. The above circuitry must be repeated for all phases apart from the multiplier 62 and the edge detector 60.

Figure 1:
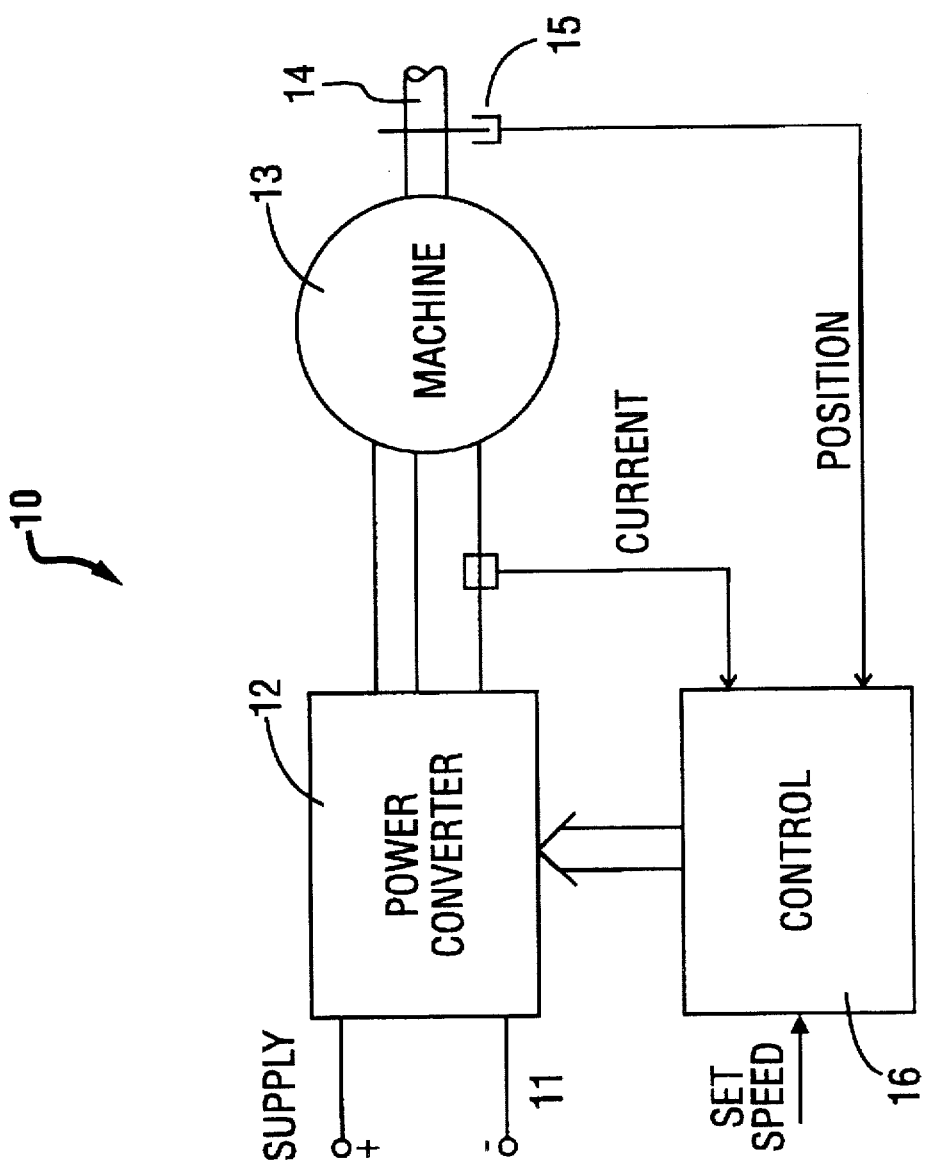
FIG. 1 is a diagram of the principal components of a switched reluctance drive system.
Figure 2:
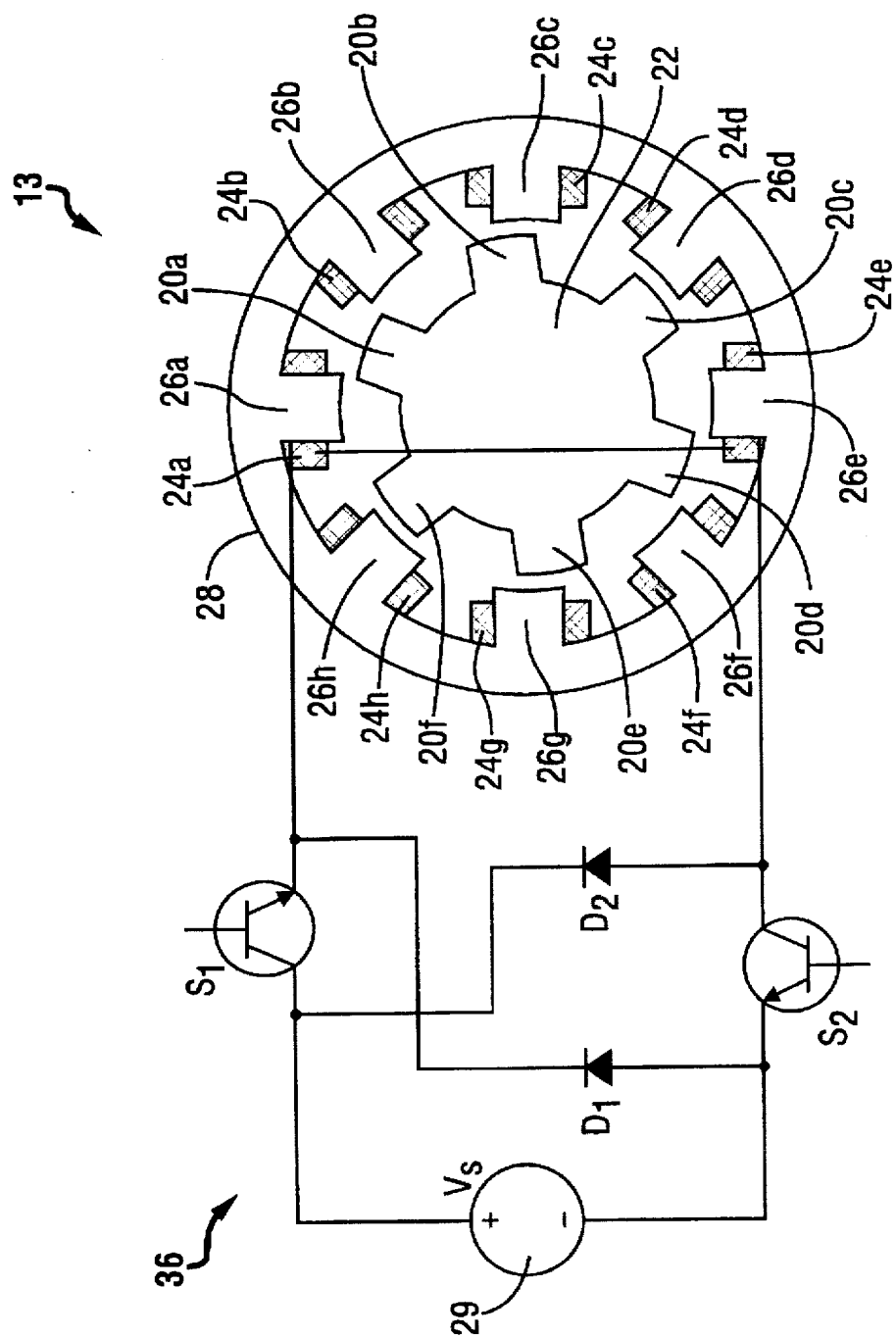
FIG. 2 is a diagram of the internal components of a machine and the connection of one phase to its power switches.
Figure 3:
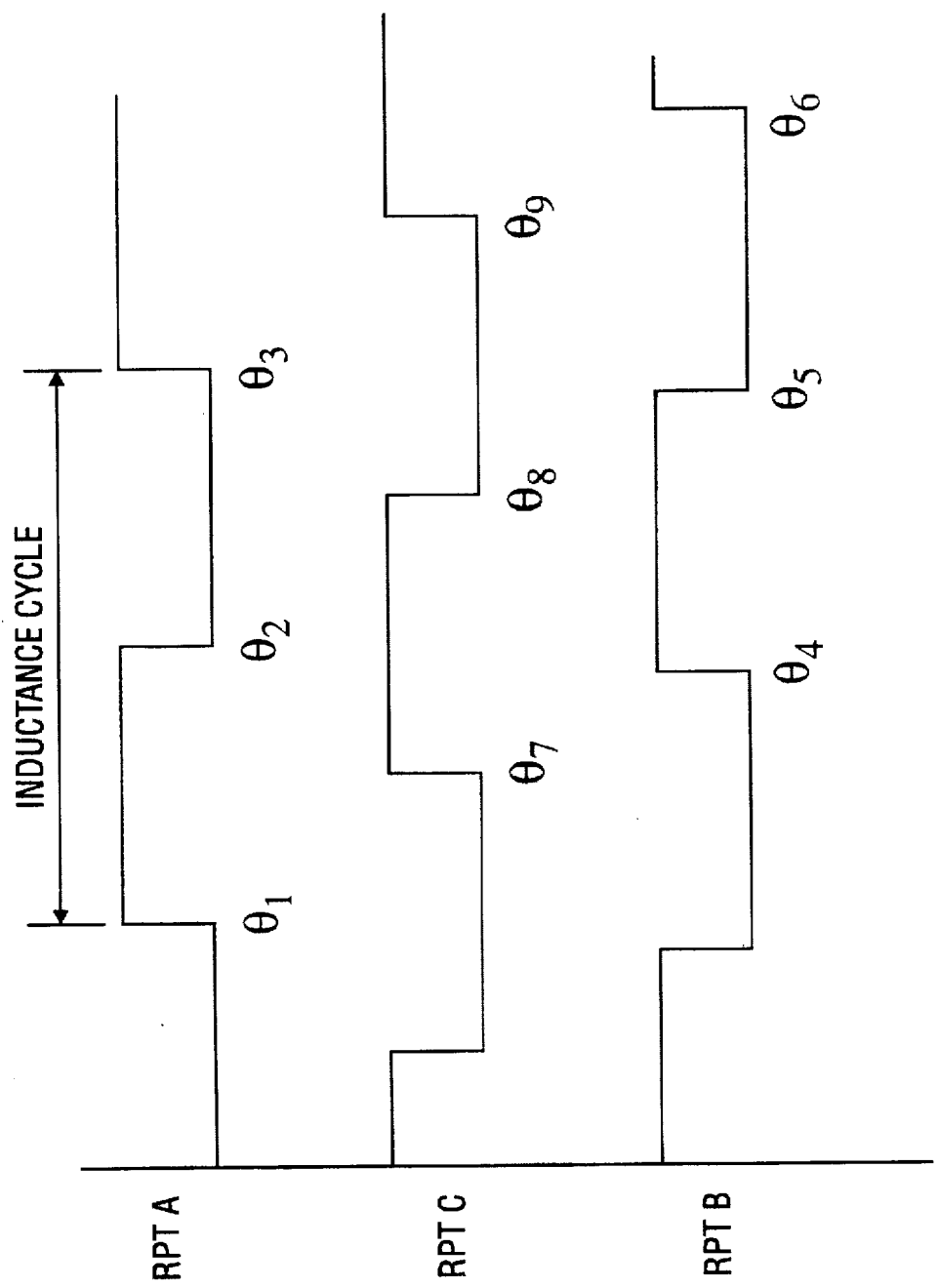
FIG. 3 shows the signals provided by a typical rotor position transducer (RPT) having three sensors and used for a three-phase switched reluctance drive.
Figure 4:
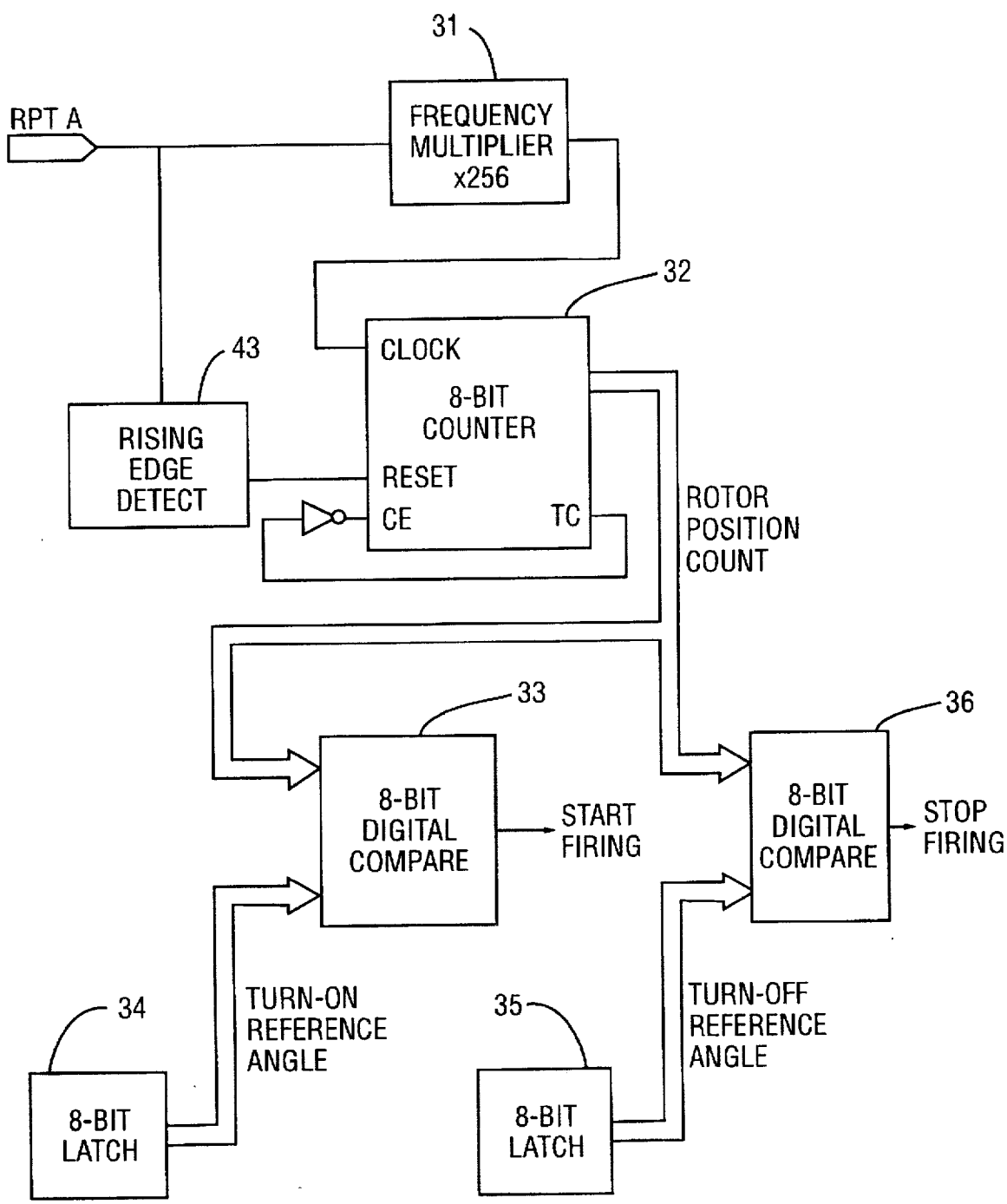
FIG. 4 is a block diagram of the typical components of an angular interpolation system used in each motor phase.
Figure 5:
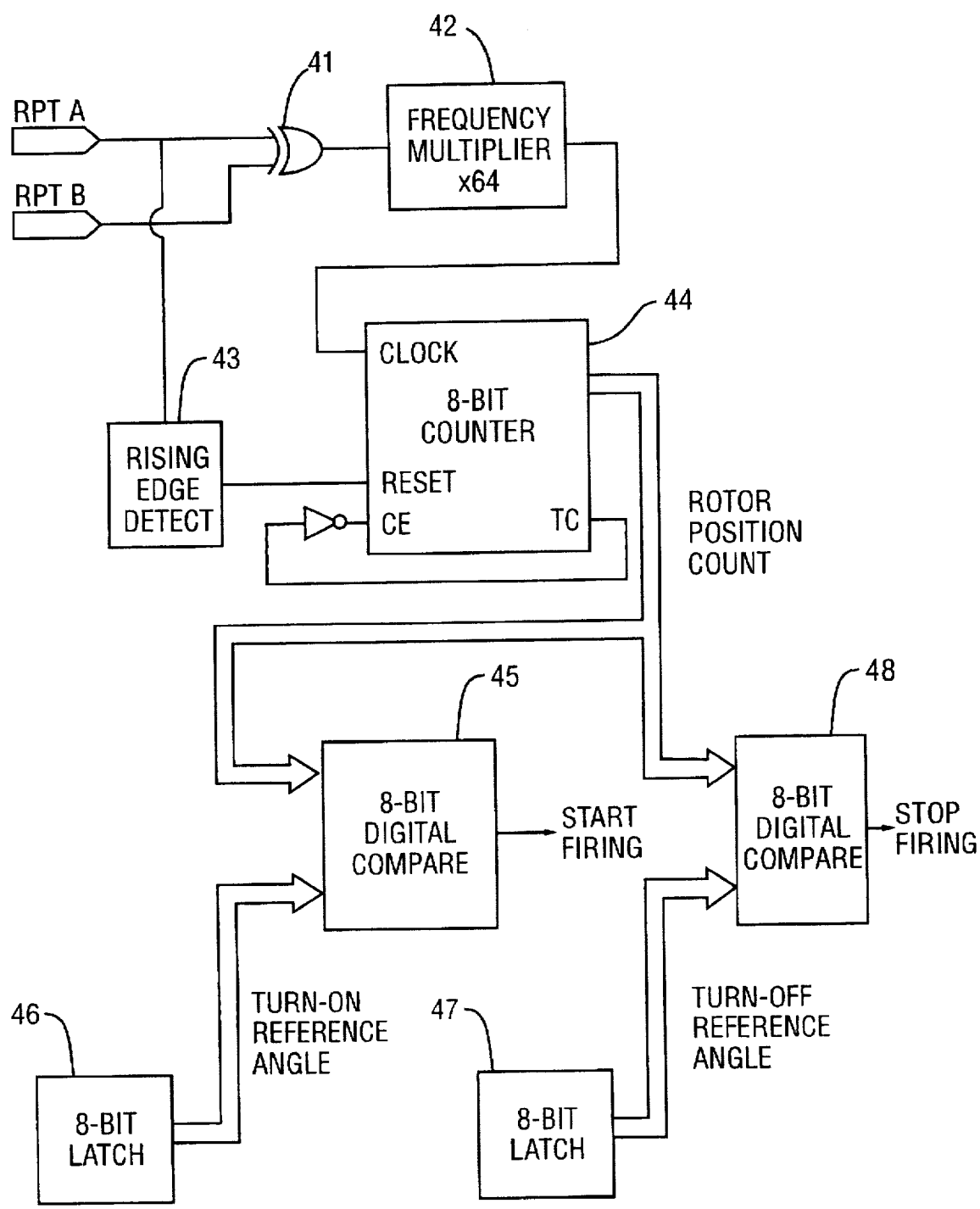
FIG. 5 is a block diagram of an improvement over the system shown in FIG. 2 and is used in systems with more than one sensor and the interpolation is based on portions of phases.
Figure 6A:
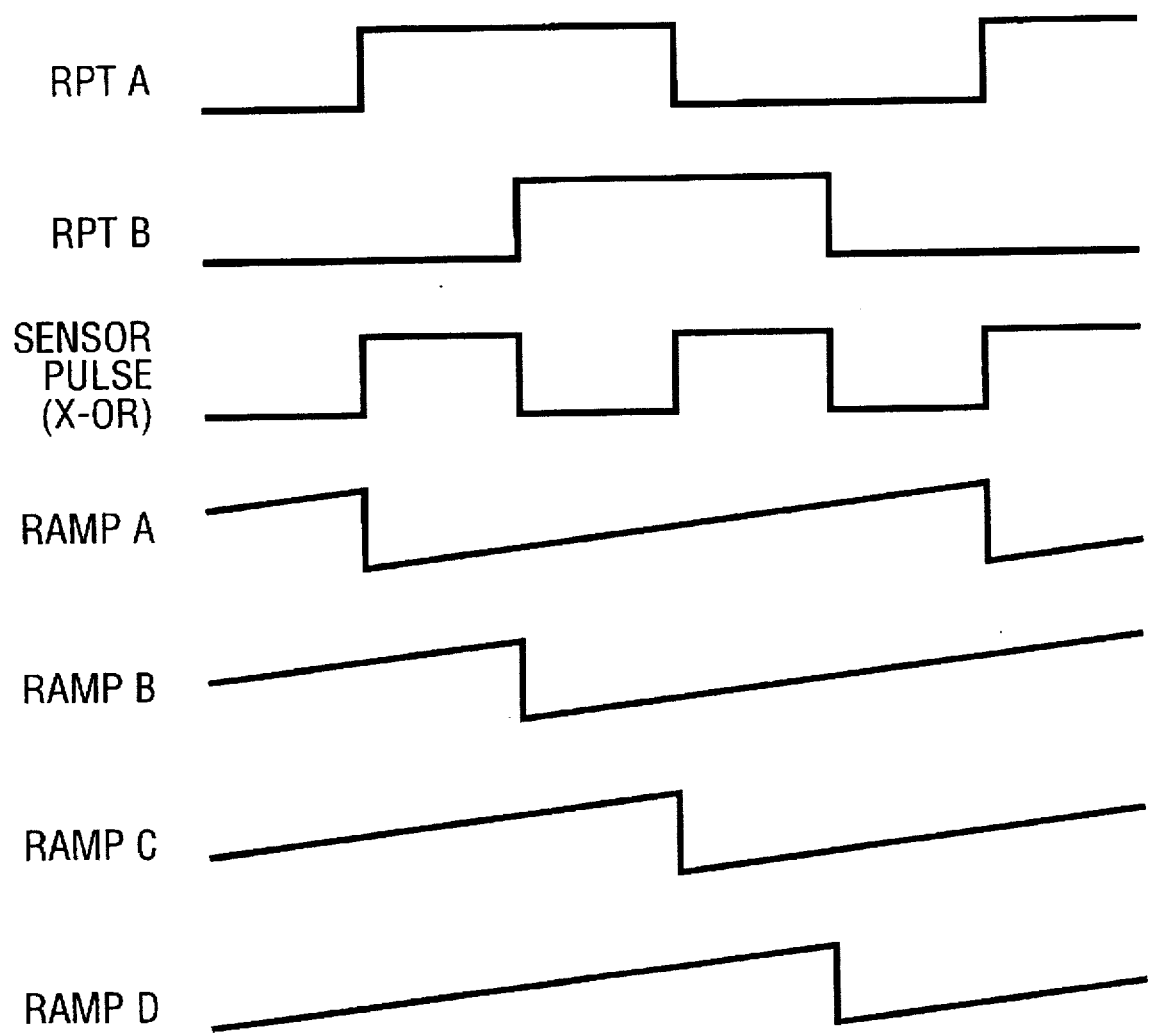
FIGS. 6a–b are timing diagrams for a group of signals present in the block diagram of FIG. 5.
Figure 6B:
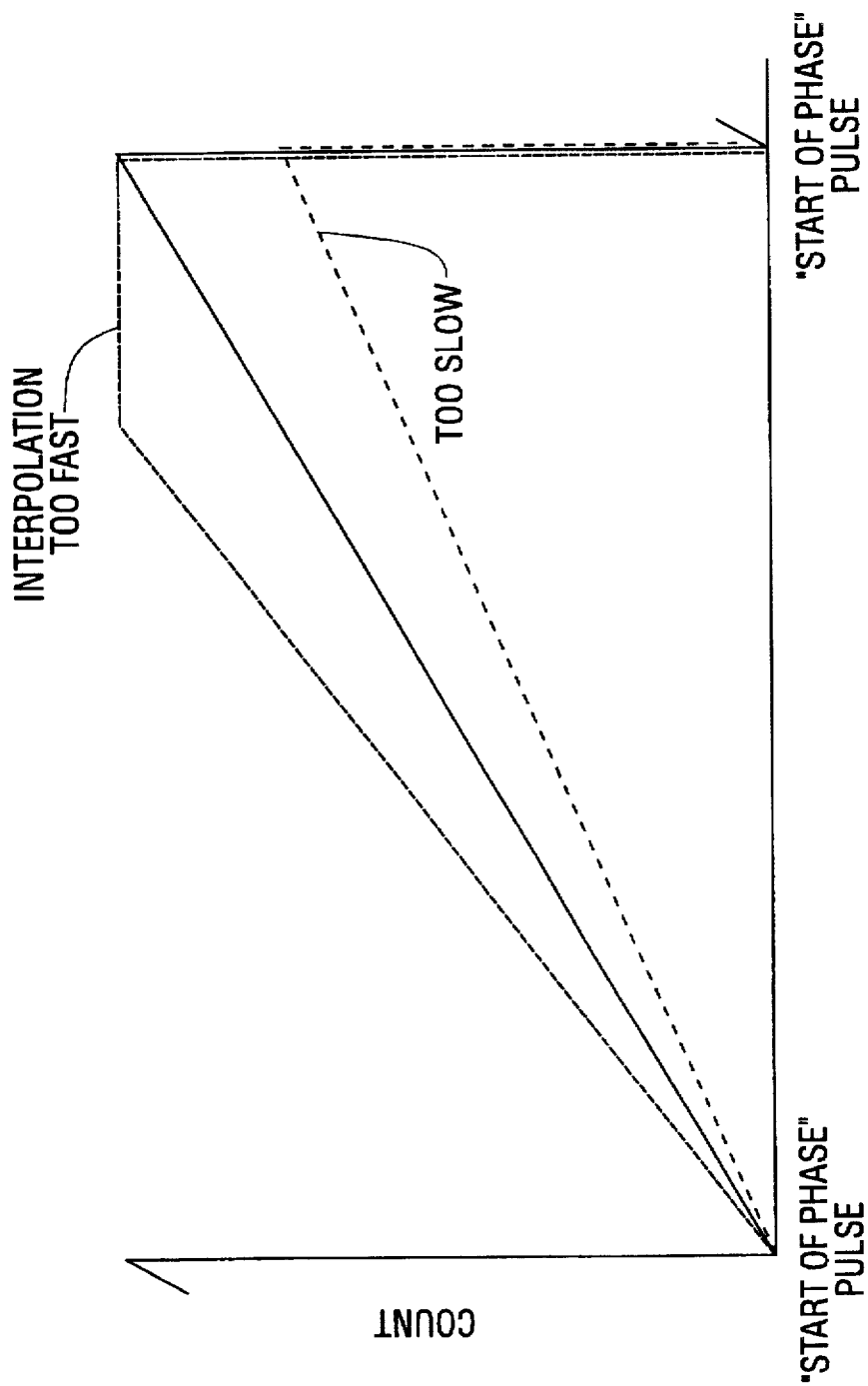
Figure 6C:
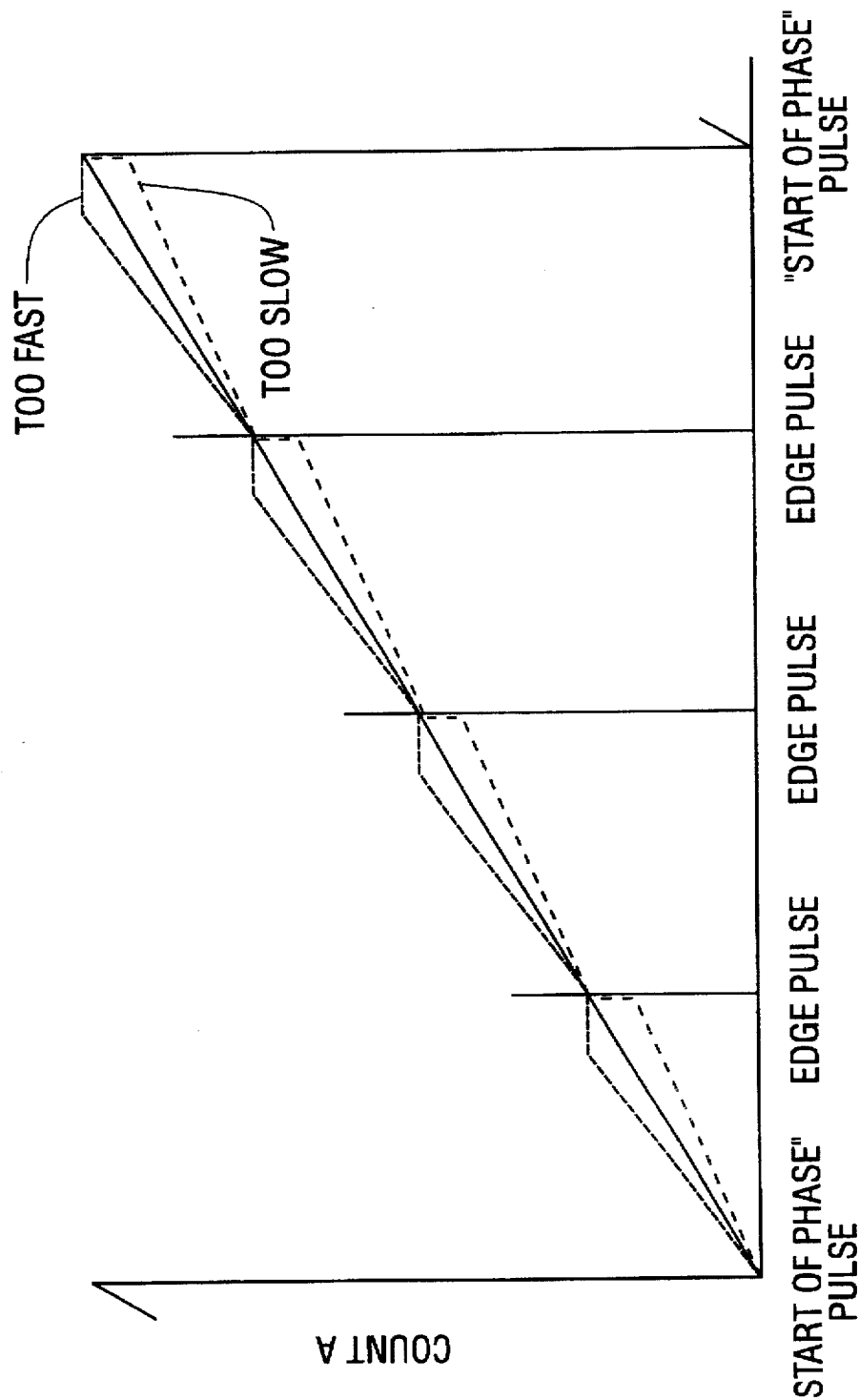
FIG. 6c represents how the digital ramp or count for a phase is adjusted in the four-phase system described in FIG. 7 according to the principles of the present invention.

Considering the previously described 4-phase machine (phases A,B,C, and D), the system described above begins operation as the RPT A signal falls to logic 0 and the phase A" counter 61 is reset at the "start of phase" A pulse. FIG. 6c shows how the digital ramp or count for phase A is adjusted at each sensor edge. The counter 61 will then be clocked at a rate determined by the frequency multiplier 62. If the machine speed is constant and all of the sensor edges are evenly spaced, then the counter 61 should reach a count of sixty-three at the next sensor edge. In that case no corrective action is needed. If the time interval between sensor edges is too long, so that a count higher than 63 would be produced, then the counter will be disabled at sixty-three until the next sensor edge arrives. This disabling occurs when the TC output of the counter 61 is fed back through an inverter and disables the counter 61 through its CE input. Conversely, if the period between sensor edges is too short, the counter may only reach, say, sixty before the next sensor edge arrives. At that sensor edge, the counter will be preset to sixty-three, and the system will count to the next sensor edge, expecting a count of 127. The phases are interleaved, so while phase A is counting to sixty-three, phases B,C and D are counting to 127, 191 and 255 respectively.

By modifying the above concept to use normalized rotor positions, a system can be produced which not only provides for performance enhancement, but also reduces the logic circuits required for implementation. In the second embodiment shown in FIG. 8, only one phase counter 73 is used to count between adjacent sensor edges for all the phases. Counting between sensor edges distinguishes this invention from prior art since the prior art provided for corrections only once during a phase. The counter 73 is consequently also reduced in size and will always start from zero and stop at the same count irrespective of which sensor edges are being used. Therefore, the counter 73 now indicates the normalized rotor position which is the rotor position between an adjacent pair of machine phases since the sensor edges are set to coincide with the aligned (i.e., the minimum reluctance) and unaligned positions of each of the phases. This simplifies the logic circuitry considerably and eliminates the necessity of presetting the counter 73. However, in order to provide full control over a phase cycle, a further determination of which machine phase should be energised must be made.

Specifically, this embodiment provides an improved method for controlling the energisation of the phase windings with an improved angle controller in switched reluctance machines having more than one phase winding and more than one position sensor, for example a four-phase machine having two position sensors. The position sensors are set so that their output signals will have sensor edges (the output of the position sensor transitioning from one logic level to another) which coincide with a predetermined datum of the inductance cycle of each of the phases. Preferably, the predetermined datum is that which corresponds to a rotor pole being completely aligned with the stator phase under consideration.

This is a position of the rotor relative to the stator which corresponds to one of minimum reluctance in the flux path between the two. Another convenient datum would be the position of the maximum reluctance at which the stator and rotor poles in question are midway between each other.

Figure 8:
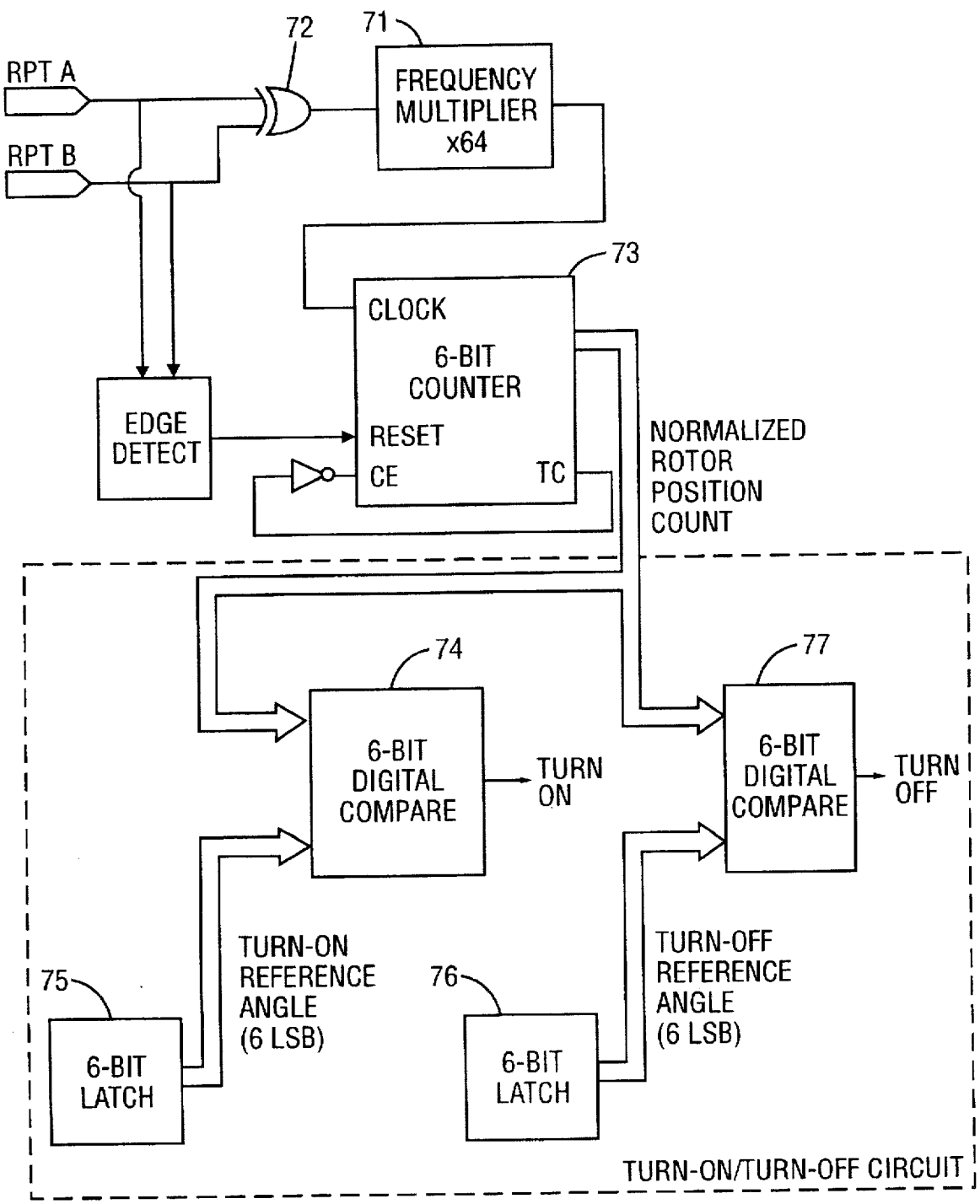
FIG. 8 is a block diagram of a second embodiment of the present invention which is used to generate the TURN-ON and TURN-OFF signals used in the voltage pulse generation circuit of FIG. 9.

The signals provided by these position sensors are combined to generate a sensor pulse signal. This sensor pulse signal has a transition edge each time a sensor edge occurs for any of the position sensors. For instance, FIG. 6a shows the position sensor signals RPT A and RPT B for a four-phase machine having two position sensors. One way to generate the sensor pulse signal is by using an exclusive-or (XOR) logic gate 72 with the sensor position signals RPTA and RPTB as its inputs, as shown in FIG. 8. The single output from the XOR gate 72 is the input to a frequency multiplier 71.

The multiplied sensor pulse signal represents an angular clock signal. This angular clock signal has an integral number of pulses between the adjacent sensor edges of the sensor pulse signal. The angular clock signal is generated using the frequency multiplier 71 with the sensor pulse signal which is the output of the exclusive-or gate 72. The angular clock signal is used for generating a normalized rotor position count which is representative of the rotor's position relative to the stator poles. For instance, in the four-phase system of FIG. 8 the output of the phase counter 73 is representative of the normalized rotor position.

This normalized rotor position count is used to generate the normalized TURN-ON and TURN-OFF signals which define the normalized conduction angles for the machine phases. For instance, in the four-phase system shown in FIG. 8 a TURN-ON/TURN-OFF circuit consists of two six-bit digital comparators 74, 77 respectively. The normalized rotor position count comprises one input to each of these six-bit digital comparators. The other input to each of the digital comparators is provided by two six-bit latches 75, 76 respectively. The four-phase system shown uses eight bits to represent the respective TURN-ON and TURN-OFF angles (not normalized), the least significant six bits being representative of the normalized TURN-ON and TURN-OFF angles. The respective TURN-ON and TURN-OFF angles (not normalized) are provided to the angle controller typically by a control law EPROM or other memory circuit, the details of which are not relevant to the description of the present invention and well known to those skilled in the art.

The remaining two bits (two most significant bits) of the TURN-ON and TURN-OFF angles (not normalized) are included to generate a firing pulse for energising the appropriate phase of the switched reluctance machine. The TURN-ON and TURN-OFF signals define the starting position and the conduction angle for all of the firing pulses used to energize each particular phase. A phase pulse circuit is shown in FIG. 9 which produces the firing pulses necessary to energize each machine phase at the appropriate time.

Figure 9:
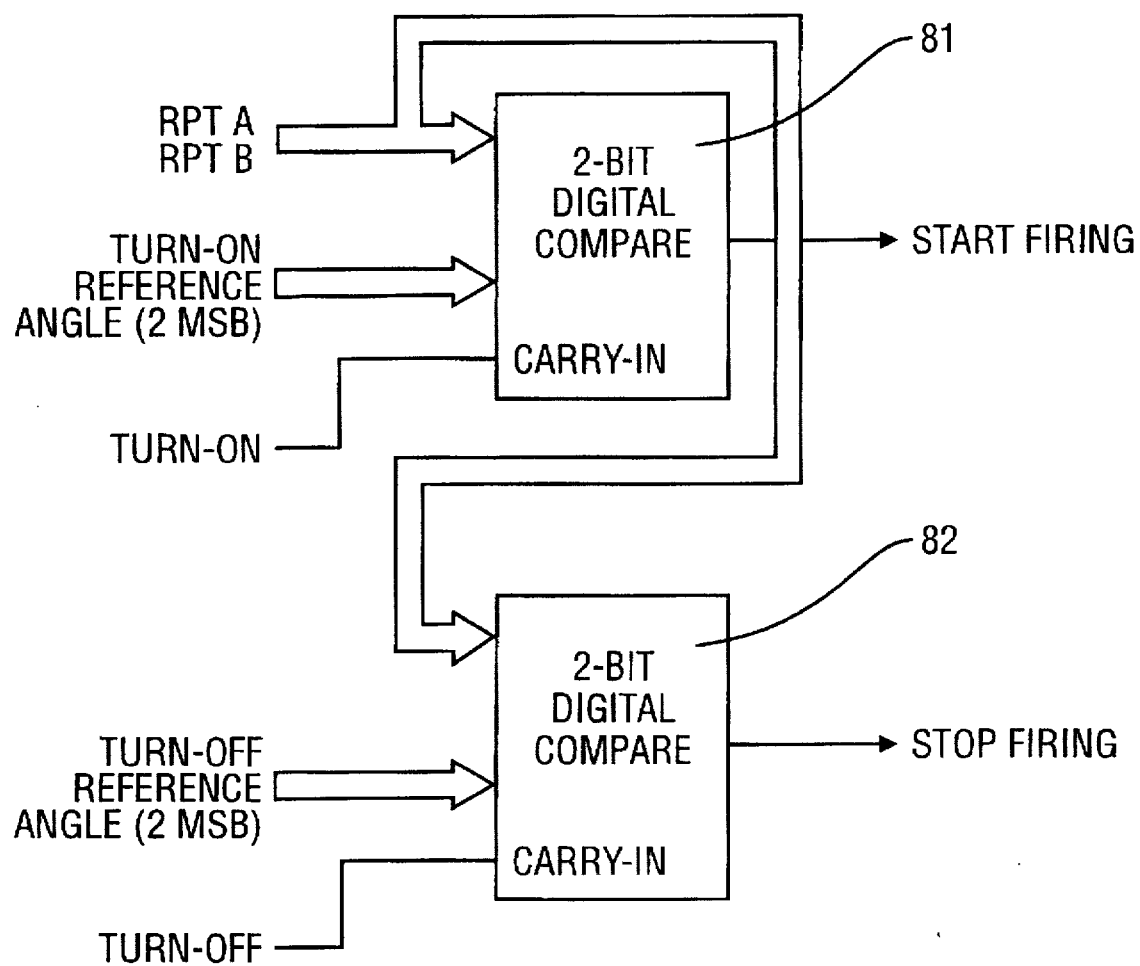
FIG. 9 is a block diagram of the voltage pulse generation circuit for a four-phase system.

The four-phase system of FIG. 9 uses the TURN-ON and TURN-OFF signals of the circuit of FIG. 8 to generate the required firing pulse. The two position sensor signals RPT A and RPT B define a two-bit digital word indicating uniquely the quadrant of the phase cycle in which the rotor is situated. The two most significant bits of the TURN-ON and TURN-OFF reference angles and the two position sensor signals RPT A, RPT B are input to two, two-bit digital comparators 81, 82 with the TURN-ON and TURN-OFF signals (which are used as a carry in) as shown in FIG. 9. The outputs of the comparators 81, 82 are used to define the start and finish of the firing pulse. The logic circuits for the other three phases are derived using identical circuits, with one or both of the sensor signals being inverted as appropriate.

A three-phase drive system may, in principle, use the same technique as described for the four-phase system. However, in a three-phase system, the number of RPT states will typically be six. Because of these six states, more than two bits are needed to represent them; the four-phase arrangement described above is inadequate for the task. However, several options exist to overcome this limitation. For instance, the six-bit counter could be set to provide less resolution. In the usual case, a six-bit counter will provide angular detection resolution of one part per sixty-four within a RPT state. However, a maximum count of forty-two could be used within a RPT state, instead of sixty-four, so that there are 252 counts in a ramp. 252 can be represented by an eight-bit number. Although this approach would work in theory, it may prove impractical to implement, as the counter cannot be easily shared between phases. Also, this embodiment requires additional circuits to derive values for the other phases.

Another option is to add a ninth bit to the TURN-ON and TURN-OFF reference angles to indicate the RPT state. In this case, three-bit digital comparators are required to process the most significant bits. Though simple, this embodiment uses a nine-bit word while most digital storage units are organized in eight-bit blocks.

A preferred implementation restricts the ranges of the TURN-ON reference angle and the TURN-OFF reference angle to four out of six states. The three bits representing the RPT state can be decoded slightly differently for the TURN-ON reference angle than the TURN-OFF reference angle. For the TURN-ON reference angle, the range is restricted to the second, third, fourth and fifth RPT states, irrespective of the value in the six-bit counter. These four states can be coded using two bits, giving a complete eight-bit ramp over the middle four RPT states. The arrangement is slightly different for the TURN-OFF reference angle because this angle is always further in the cycle than the TURN-ON reference angle. In the case of the TURN-OFF reference angle the first two states are disabled, allowing a full ramp over the last four states.

Figure 10:
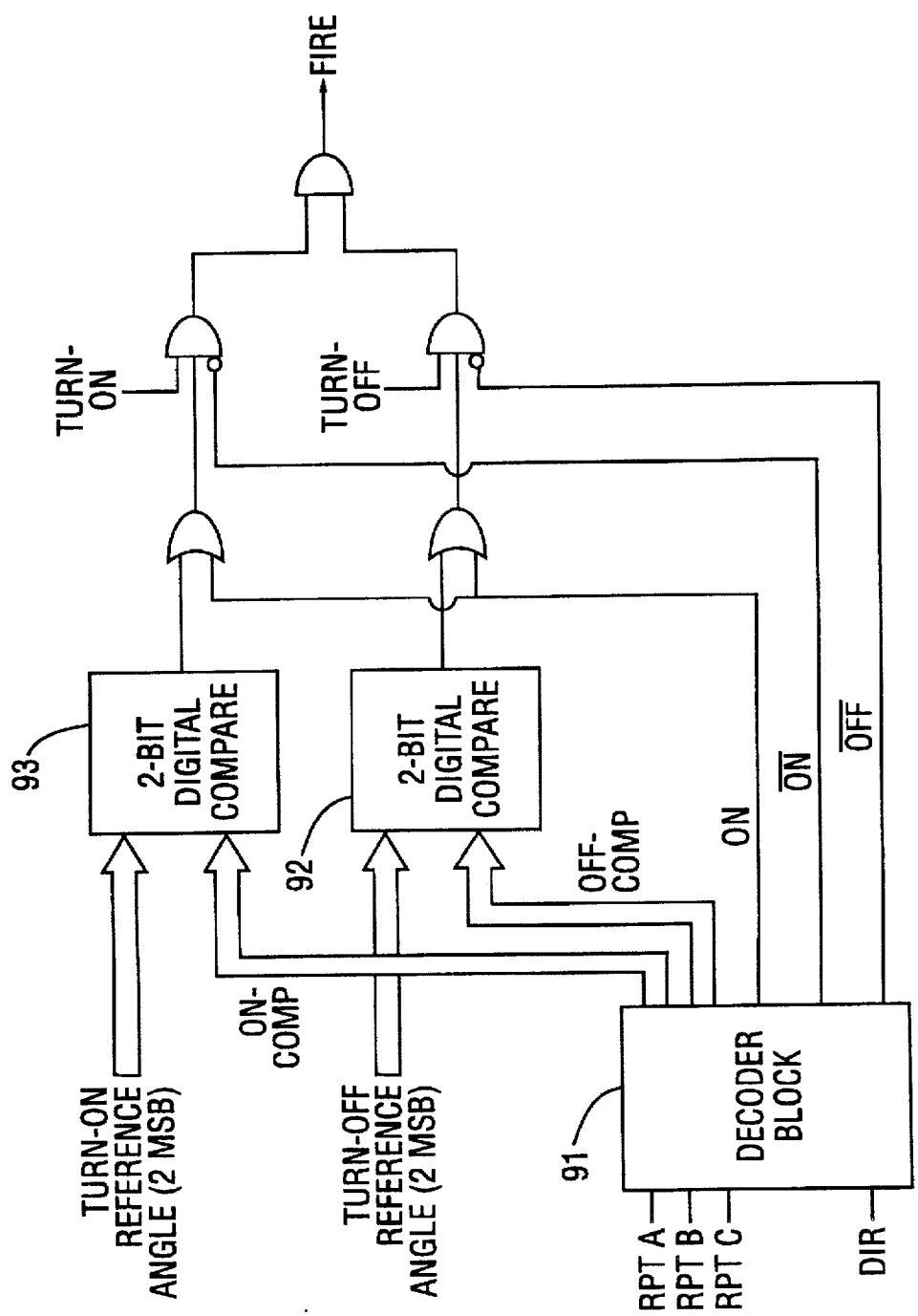
FIG. 10 is a block diagram of a voltage pulse generation circuit for a three-phase system.

FIG. 10 shows the preferred embodiment of the three-phase system, the main difference from the four-phase system being the implementation of the firing circuit, which requires additional signals and logic circuits. The two most significant bits of the TURN-ON and TURN-OFF reference angles and the two 2-bit signals ON-COMP and OFF-COMP from the decoder block 91 are input to two, two-bit digital comparators 92, 93 as shown in FIG. 10. The decoder block 91 has among its inputs the three sensor position signals RPT A, RPT B, and RPT C and the rotational direction signal DIR. The decoder block 91 has as outputs the aforementioned two-bit signals ON-COMP and OFF-COMP, as well as ON, ON-BAR, and OFF-BAR, shown in FIG. 10. The decoder block 91 may be implemented by a programmable logic array or other similar circuits as are known by those skilled in the art.

Thus, the principles of the present invention, which have been disclosed by way of the above examples and discussion, can be implemented using various configurations and arrangements. Those skilled in the art will readily recognize that various other modifications and changes may be made to the present invention without strictly following the exemplary application illustrated and described herein and without departing from the true spirit and scope of the present invention, which is set forth in the following claims.

I claim:

1. A method of determining a conduction angle for a switched reluctance machine having more than one phase winding and using more than one position sensor, said position sensors detecting sensor edges, said method comprising the steps of:

determining an expected value of a counter for each sensor edge;

incrementing said counter during rotation of the machine between sensor edges at a frequency corresponding to the frequency of occurrence of said sensor edges; and adjusting said counter on each sensor edge, such that the output of the counter is equal to said expected value for the sensor edge.

2. The method of claim 1 wherein said counter is reset on each sensor edge.

3. The method of claim 1 comprising the further step of generating a firing pulse for the phase winding defined by said conduction angle.

4. The method of claim 1 wherein adjusting said counter comprises stopping said counter if said counter has reached an expected value and loading said counter with said expected value if the expected value has not been reached.

5. The method of claim 1 wherein the value of said counter is normalized.

6. A method of controlling the energization of a phase winding in a switched reluctance machine having more than one phase winding and using more than one position sensor, wherein each change in state in any of the position sensors defines a position sensor edge, the method comprising the steps of:

generating TURN-ON and TURN-OFF signals using a rotor position count;

defining a pre-established rotor position count for each position sensor edge;

adjusting said rotor position count on each position sensor edge such that the rotor position count is equal to the pre-established count for that position sensor edge; and generating a voltage control pulse defined by the TURN-ON and TURN-OFF signals and the adjusted rotor position count for energizing the appropriate phase winding.

7. The method of claim 6 which generates normalized TURN-ON, TURN-OFF using a normalized rotor position count and which generates a voltage control pulse defined by the normalized TURN-ON and TURN-OFF signals.

8. The method of claim 6 which provides the further step of generating a FREE-WHEEL angle.

9. The method of claim 6 which provides the further step of resetting said rotor position count on each sensor edge.

10. A method for controlling the energization of a phase winding in a switched reluctance machine having more than one phase winding and using more than one position sensor, the method comprising the steps of:

generating a sensor pulse having a transition edge at each active rotor position, wherein each transition edge corresponds to a given active rotor position;

generating an angular clock signal having a predetermined number of pulses between adjacent transition edges of the sensor pulse;

generating a rotor position count using the angular clock signal;

defining a pre-established rotor position count for each active rotor position;

adjusting said rotor position count on each transition edge such that the rotor position count is equal to the pre-established rotor position count for the active rotor position corresponding to the transition edge;

generating a normalized TURN-ON signal when the adjusted rotor position count reaches a predetermined TURN-ON count;

generating a normalized TURN-OFF signal when the adjusted rotor position count reaches a predetermined TURN-OFF count; and generating a voltage control pulse defined by the normalized TURN-ON and TURN-OFF signals for energizing the appropriate phase.

11. In a switched reluctance machine having a rotor, a stator including more than one phase winding and more than one position sensor, wherein each change in state in any of the position sensors defines a sensor edge, an angle interpolation unit comprising:
 a counter having an output that is changed at a given frequency between sensor edges; and
 means for adjusting the output of said counter to a pre-defined value at a given sensor edge, wherein the pre-defined value corresponds to an expected counter output value for the given sensor edge.

12. The angle interpolation unit of claim 11 where said counter uses normalized values.

13. In a switched reluctance machine having a rotor, a stator including more than one phase winding, and more than one position sensor, an angle controller providing a voltage control pulse for each phase winding comprising:
 means for detecting position sensor edges;
 means for determining a maximum count between said position sensor edges;
 a counting circuit comprising means for counting between said position sensor edges; means for halting said counting if said maximum count is reached before another position sensor edge; means for loading said counting circuit with said maximum count if another position sensor edge is detected before said counting circuit reaches said maximum count; and
 a comparison circuit comprising means for comparing the count of said counting circuit to a predetermined value and means for sending a voltage control pulse when said predetermined value equals said count of said counting circuit.

14. The controller of claim 13 wherein said count of said counting circuit is a normalized value.

15. In a switched reluctance machine having a rotor, a stator including more than one phase winding, and more than one position sensor, an angle controller providing TURN-ON and TURN-OFF signals for each phase winding comprising:
 a sensor circuit that generates a sensor pulse signal using signals from the position sensors having sensor edges;
 a frequency multiplier that generates an angular clock signal having a predetermined integer number of sensor pulses between adjacent sensor edges of the sensor pulse signal;
 a counter clocked by the angular clock signal, the output of the counter representing a rotor position count;
 a TURN-ON/TURN-OFF circuit that generates a TURN-ON signal and a TURN-OFF signal when the normalized rotor position count reaches a predetermined TURN-ON count and a predetermined TURN-OFF count;
 means for adjusting said TURN-ON count and said TURN-OFF count at each position sensor edge;
 a phase pulse circuit for generating a voltage control pulse defined by the TURN-ON and TURN-OFF signals for energising the appropriate phase.

16. A controller for a reluctance machine having a rotor, a stator, at least one phase winding and switch means responsive to turn-on and turn-off signals for controlling the current in the phase winding, the controller comprising;
 a rotor position indicator operable to generate a rotor position signal comprising a plurality of features within a phase inductance cycle of the rotor movement relative to the stator, the features including a datum feature for the phase;
 a multiplier for multiplying the frequency of the features;
 a counter arranged to count the occurrence of the features at the multiplied frequency from the datum feature;
 comparator means for comparing the output of the counter with a count value corresponding to the count from the datum feature to a subsequent feature;
 enabling means arranged to generate the switch means turn-on signal at the start of a conduction angle;
 disabling means arranged to generate the switch means turn-off signal when either the counter value is reached or a subsequent one of the features of the rotor position signal, indicative of a turn-off angle is reached.

17. A controller as claimed in claim 16 in which the disabling means are arranged to reset the counter when the count is stopped.

18. A controller as claimed in claim 16 including an edge detector, the features being the consecutive rising and/or falling edges of pulses constituting the rotor position signal.

19. A controller as claimed in claim 16 in which the rotor position indicator is operable to generate the datum feature coincident with a position of minimum reluctance of the rotor relative to the stator for the or each phase.

20. A controller as claimed in claim 16 for a multi-phase machine in which the rotor position indicator is operable to generate the rotor position signal including data for each respective phase.

21. A controller as claimed in claim 16 in which the rotor position indicator is operable to generate the said features at regular angular intervals of the orientation of the rotor with respect to the stator.

22. A switched reluctance machine system comprising:
 a reluctance machine having a rotor, a stator and at least one phase winding;
 switch means responsive to turn-on and turn-off signals for controlling the current in the phase winding;
 a rotor position indicator which generates a rotor position signal as the rotor rotates relative to the stator, the signal comprising a plurality of features within a phase inductance cycle of the rotor movement relative to the stator, which features include a datum feature for the phase;
 a multiplier for multiplying the frequency of the features;
 a counter which counts the occurrence of the features at the multiplied frequency from the datum feature;
 comparator means for comparing the output of the counter with a count value corresponding to the count from the datum feature to a subsequent feature;
 enabling means which generate the switch means turn-on signal at the start of a conduction angle;
 and disabling means which generate the switch means turn-off signal when either the count value is reached or a subsequent one of the features of the rotor position signal indicative of a turn-off angle is reached.

23. A system as claimed in claim 22 in which the disabling means reset the clock when the count is stopped.

24. A controller as claimed in claim 22 including an edge detector, the features being the consecutive rising and/or falling edges of pulses constituting the rotor position signal.

25. A controller as claimed in claim 22 in which the rotor position indicator generates the datum feature coincident with a position of minimum reluctance of the rotor relative to the stator for the or each phase.

26. A controller as claimed in claim 22 for a multi-phase machine in which the rotor position indicator generates the rotor position signal including data for each respective phase.

27. A controller as claimed in claim 22 in which the rotor position indicator generates the features at regular angular intervals of orientation of the rotor with respect to the stator.

28. A method of controlling the energisation of the phase winding of a reluctance machine, the method comprising;

turning on switch means at the start of a phase conduction angle;

generating a first rotor position signal coincident with a predefined datum in relation to the phase inductance cycle;

generating subsequent signals coincident with points in the phase inductance cycle;

multiplying the frequency of the rotor position signals;

counting the rotor position signals at the multiplied frequency from the datum;

comparing the count with a count value corresponding to the count from the datum to a subsequent one of rotor position signals;

turning off the switch means either when the count value is reached or the subsequent rotor position signal, indicative of a turn-off angle is reached.

29. A method as claimed in claim 28 including resetting the count when the switch means are turned off.

30. A method as claimed in claim 28 in which the rotor position signals are rising and/or falling edges of pulses.

31. A method as claimed in claim 28 in which the first rotor position signal is coincident with the position of minimum reluctance of the rotor relative to the stator for the phase.

32. A method as claimed in claim 28 in which the machine is a multi-phase machine and the data features are generated for each respective phase.

\* \* \* \* \*